W. E. BROWNING.
COOKING UTENSIL.
APPLICATION FILED JAN. 26, 1918.
1,304,448.
Patented May 20, 1919.
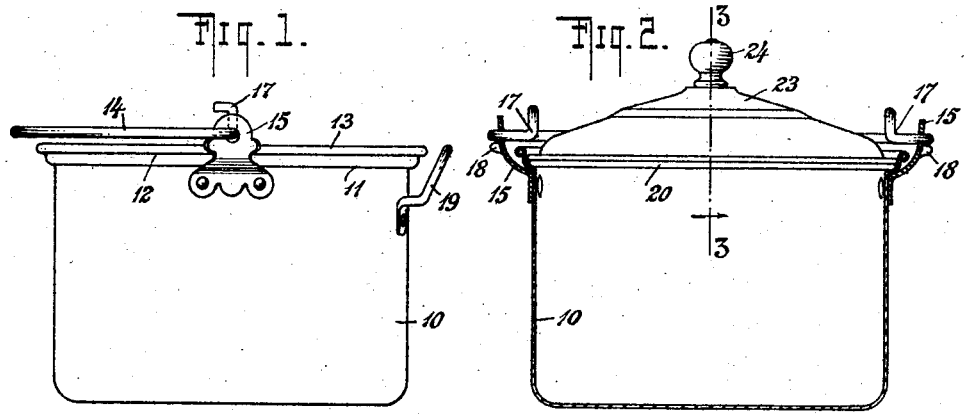
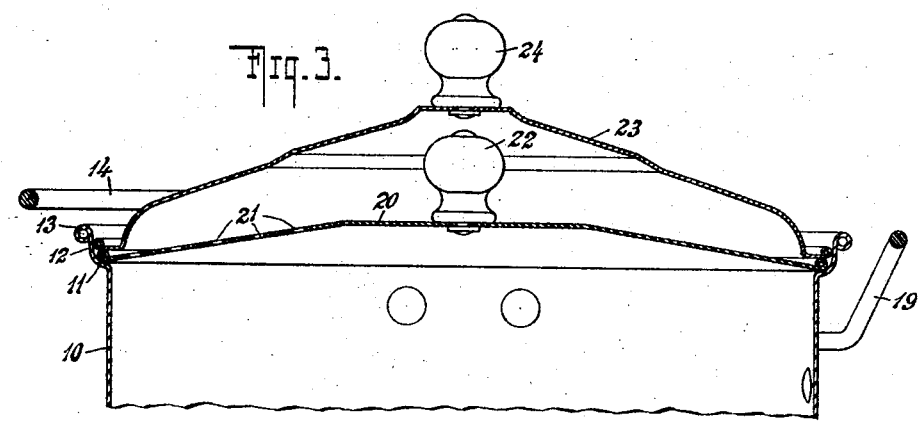
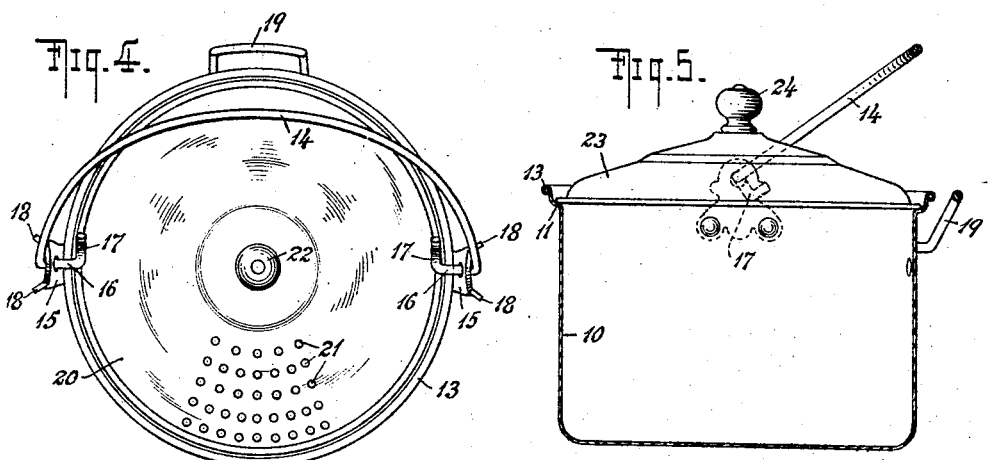
WITNESSES
INVENTOR
WILLIAM E. BROWNING
BY
ATTORNEYS

UNITED STATES PATENT OFFICE.

WILLIAM E. BROWNING, OF WELLSVILLE, NEW YORK.

COOKING UTENSIL.

1,304,448. Specification of Letters Patent. Patented May 20, 1919.

Application filed January 26, 1918. Serial No. 213,896.

*To all whom it may concern:*

Be it known that I, WILLIAM E. BROWNING, a citizen of the United States, and resident of Wellsville, county of Allegany, and State of New York, have invented certain new and useful Improvements in Cooking Utensils, of which the following is a specificatiton.

My invention relates to cooking utensils and has for its object to provide a culinary vessel or pot of improved construction and embodying an improved cover arrangement whereby the efficiency of the vessel is increased to a maximum extent. My invention will be fully described hereinafter and the features of novelty will be pointed out in the appended claims.

In the accompanying drawings, which for illustrative and descriptive purposes show an example of my invention, Figure 1 is an elevation of my improved culinary vessel; Fig. 2 is a central vertical section thereof; Fig. 3 is a detail section on an enlarged scale on the line 3—3 of Fig. 2; Fig. 4 is a plan view and Fig. 5 is a sectional view similar to Fig. 2 but taken in a plane at right angles thereto.

As shown in the drawings my improved utensil comprises the vessel 10 which may be of any desired size and shape and which is formed at its upper portion with an annular shoulder 11 and an upwardly extending continuing annular flange 12 terminating in an annular bead or the like 13. A bail or handle 14 of suitable dimensions is pivotally connected with lugs or ears 15 secured to or forming part of the vessel 10 at diametrically opposite points; the bail 14 extends inwardly beyond the lugs or ears 15 as indicated at 16 and is provided with cam members 17 which preferably comprise continuations of the bail bent into the desired form as shown in Fig. 1 and by dotted lines in Fig. 5.

If desired the ears or lugs 15 may be formed with projections 18 upon which the bail or handle 14 is arranged to rest as illustrated for instance in Fig. 4. The vessel 10 is further preferably provided with a suitable handle 19 located thereon at a point midway between the lugs 15.

An inner cover 20 which may be provided with perforations 21 or other devices adapting it for particular purposes is adapted to fit within the flange 12 and to rest upon the shoulder 11 when in position upon the vessel 10 as illustrated in Figs. 2 and 3. In order to provide for the ready manipulation of the cover 20 it may include a handle or knob 22. My improved utensil, in the preferred form, further includes an outer cover 23 which may be used in combination cover 23 with the inner cover 20, in which case it rests upon said inner cover 20 when in position on the vessel 10, as shown in Figs. 2 and 3 or which may be used alone, in which case said outer cover 23 rests directly upon the shoulder 11 when combined with the vessel 10 as illustrated in Fig. 5. When both covers are used the inner cover is entirely covered by the outer cover and forms therewith an air space, as shown in Fig. 3. The outer cover 23 both when used alone and in combination with the cover 20, fits within the flange 12, it being understood that both covers 20 and 23 are of a diameter sufficient to completely close the vessel 10. The outer cover 23 is also preferably provided with a handle or knob 24 for facilitating the manipulation thereof.

Both covers 20 and 23 when combined with the vessel either singly or in combination have their peripheries located below the upper edge of the flange 12 and beyond the inner edge of the shoulder 11; with this arrangement the peripheries of said covers are inclosed and a more satisfactory and efficient closure is effected than in utensils in which the cover rests upon the upper edge of the vessel. By bringing the bail 14 to the position shown in Fig. 5 the cam members 17 will bear upon one or the other of the covers 20 and 23, this depending on whether one or both covers are used; in this condition of the parts the vessel may be supported by the bail 14 and tilted thereon through the medium of the handle 19 without disturbing said covers. In other words the latter are firmly held upon the vessel 10 by means of the cam members 17 as will be apparent.

The contents of the vessel may, in this manner be efficiently strained, liquids may be readily poured from solid materials contained therein, or any other results following the tilting of the vessel may be easily and comfortably secured.

During the time the vessel 10 is upon the stove for the purpose of cooking the contents, the bail 14 may be left in the position indicated in Fig. 5; if this is done the cam members 17 prevent the cover or covers from being completely removed from the vessel 10 by interior forces resulting from the cooking operation and at the same time provide a yielding resistance which permits said covers to be displaced sufficiently to relieve said interior forces.

In the preferred construction which includes the two covers, both covers are independent units having no permanent connection with each other. The purpose of providing the two independent covers, preferably spaced from each other, may be stated as follows: If, as in the illustrated example, the inner cover is provided with perforations to permit drawing off the liquid contents of the vessel 10 by tilting it, it is evident that steam, bearing volatile flavoring substances of the contents, escapes through said perforations during boiling and simmering. The outer cover prevents these substances from reaching the atmosphere and by completely closing the vessel 10 prevents the so-called "odor of cooking." The provision of the two independent covers furthermore increases the range of usefulness of the utensil by making it possible to use the vessel 10 with either the inner or outer cover alone or with both covers concurrently. It is obvious that in some cases it may be of advantage to use the covers singly and that in others both covers are necessary to produce a result of maximum satisfaction. The efficiency of the utensil is thus increased to a maximum extent.

By spacing the inner and outer covers apart as is preferred, provision is made for the accommodation of the handle 22 of the inner cover 20; it is thus possible to construct said handle in the form of a knob or the like which is readily accessible and whereby said cover may be readily manipulated. The arrangement also permits the handle 22 to be made of a material which is a poor conductor of heat thus reducing the inconvenience of handling and possibility of injury from burns to a minimum. The air space between the two covers provides an insulation whereby the heat is effectively maintained in the vessel, which tends to save fuel and whereby the period of time necessary to complete a given cooking operation is reduced to a minimum. At the same time, the air space serves to receive and retain any vapors which escape through the perforations of the inner cover; the outer cover being in contact with the outer air, provides a condensing surface for such vapors which, after condensation flow along the inner cover and return to the vessel, through the perforations of said inner cover. Loss or reduction of the contents of the vessel through vaporization is thus reduced also to a minimum.

My improved utensil is simple in construction and efficient in operation and may be satisfactorily used for many purposes.

Various changes in the specific form shown and described may be made within the scope of the claims without departing from the spirit of the claims.

I claim:—

1. A cooking utensil comprising a vessel having an annular shoulder, an upright, integral annular flange inclosing said shoulder, an inner cover fitted within said flange and resting upon said shoulder, an independent outer cover having its periphery located within said flange and resting upon said inner cover and being otherwise spaced therefrom, a handle on said inner cover projecting into the space between it and the outer cover and a handle on said outer cover.

2. A cooking utensil comprising a vessel having an annular shoulder, an annular flange forming an upward continuation of said shoulder, an inner cover provided with perforations and fitted within said flange and resting upon said shoulder and an independent outer cover fitted within said flange and having its periphery resting upon said inner cover, said covers being spaced apart at their intermediate portions.

3. A cooking utensil comprising a vessel having an annular shoulder, an annular flange forming an upward continuation of said shoulder, a perforated inner cover arranged to fit within said flange and to rest upon said shoulder, an imperforate independent outer cover fitted within said flange and having its periphery resting upon said inner cover and being otherwise spaced therefrom, a bail pivotally connected with said vessel, a handle whereby said vessel may be tilted upon said bail and cam members forming part of said bail and adapted to engage said outer cover to prevent the complete displacement of both covers as said vessel is tilted.

4. A cooking utensil comprising a vessel having an annular shoulder, an upright, integral annular flange inclosing said shoulder, an inner cover fitting within said flange and resting upon said shoulder, said inner cover having a group of perforations within a restricted area and being otherwise imperforate, an independent outer cover fitting within said flange and resting upon said inner cover, said outer cover having no permanent connection with said inner cover and means for manipulating said covers.

In testimony whereof I have hereunto set my hand.

WILLIAM E. BROWNING.

Copies of this patent may be obtained for five cents each, by addressing the "Commissioner of Patents, Washington, D. C."